May 1, 1945.  P. W. GAENSSLE  2,374,859
BRAKE MECHANISM
Filed Oct. 2, 1943

INVENTORS
Paul W. Gaenssle
BY
ATTORNEY

Patented May 1, 1945

2,374,859

UNITED STATES PATENT OFFICE 2,374,859

BRAKE MECHANISM

Paul W. Gaenssle, Detroit, Mich., assignor to Budd Wheel Company, Philadelphia, Pa., a corporation of Pennsylvania Application October 2, 1943, Serial No. 504,685

4 Claims. (Cl. 188—153)

The invention relates to a brake mechanism and more particularly to such a mechanism in which the non-rotary brake member or members and the actuating means therefor are mounted on a support including a casing housing in large part, the actuating means.

Ordinarily, the essential parts of such actuating means comprise a brake actuating lever for cooperation, on the one hand, with the brake member or shoe and on the other hand, with a cylinder actuator within the casing.

It is a main object of the invention to provide a construction which facilitates the manufacture of the brake actuating lever and the casing in which it is mounted, and which also facilitates the assembly and disassembly of these parts with each other and at the same time provides a sturdy and efficient mounting for the lever and an efficient arrangement for sealing the casing against the entrance of dirt and water.

Other and further objects and advantages and the manner in which they are attained will become apparent from the following detailed description when read in connection with the accompanying drawing forming a part of this specification.

In the drawing, the invention has been shown applied to a rail car truck brake mechanism generally similar to that disclosed in co-pending application, Serial No. 399,779 filed June 26, 1941, for Brake mechanism, but it will be understood that the main features of the invention are equally applicable to other types of brakes and usable in other relations.

In the embodiment shown, a wheel to be braked is indicated at 10, and to it is bolted the rotary brake ring indicated at 11. The brake support 12 may be the usual U or C-shaped support suspended by a three point suspension, two points of suspension being adjacent the opposite ends of the axle carrying the wheel 10 and a third point being on the transom of the truck.

Figure 1:
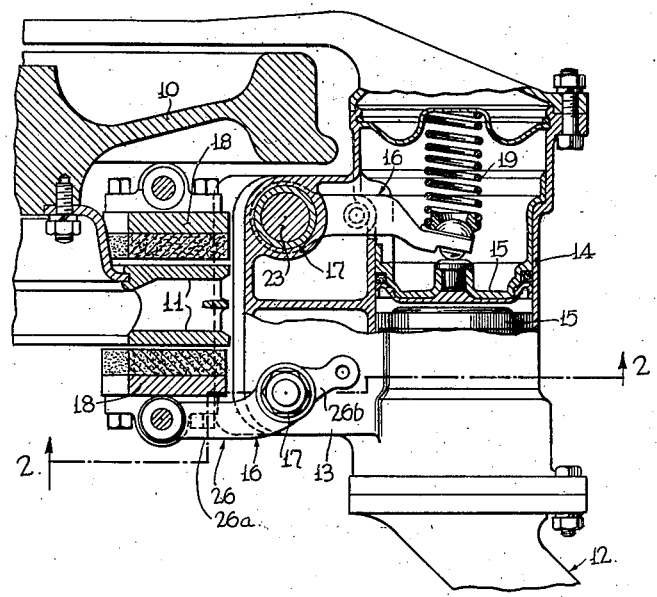
Fig. 1 is a fragmentary part-sectional and part-plan view of the brake mechanism of the invention as applied to a rail car truck, the section being indicated by the line 1—1 of Fig. 2.
Figure 2:
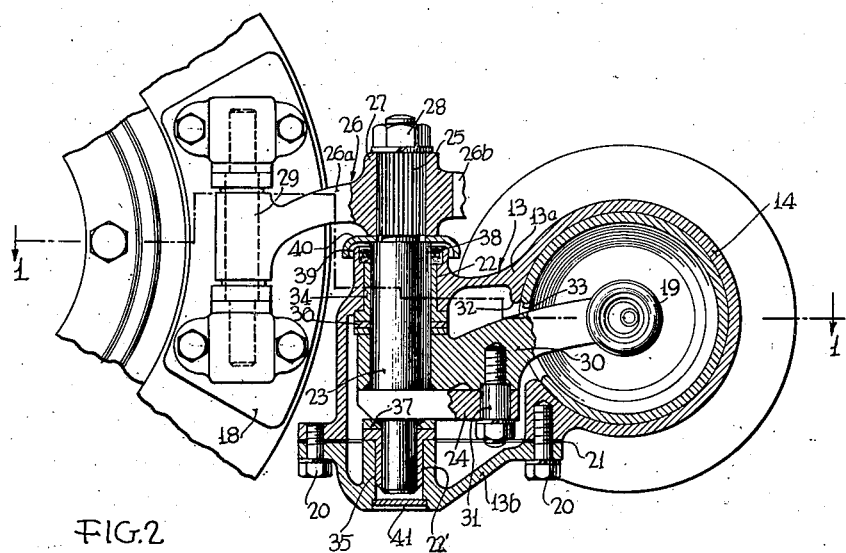
Fig. 2 is a vertical sectional view, the section being taken substantially on the line 2—2 of Fig. 1.

The brake support is for the most part of hollow construction embodying in the region adjacent the brake ring 11 a sealed casing 13 widened in fore and aft direction and carrying within it adjacent the wall thereof remote from the ring 11 a brake cylinder 14 carrying opposed skirted pistons 15, 15. Each of these pistons has cooperating abutting relation with one of a pair of actuating levers 16, 16 pivoted near the wall of the casing 14 adjacent to the brake ring 11 at points 17, 17 respectively, these levers pivotally carrying brake shoes 18, 18 respectively arranged at opposite side of the brake disc 11, for braking cooperation therewith, when fluid pressure is supplied to the cylinder in the space between the pistons. Springs, as 19 return the actuating levers, shoes and pistons to their inoperative positions, shown in Fig. 1.

The construction so far described corresponds to the construction disclosed in the prior application above referred to. The specific construction of the actuating levers and their mounting in the casing form the main features of this invention and will now be described in detail. Each lever is similarly constructed and mounted, and a description of one will therefore be sufficient for a full understanding of the invention.

For convenience of manufacture and assembly the casing 13 is divided along a generally horizontal plane into an upper main body portion 13a and a lower cover portion 13b. These parts are securely bolted together at numerous spaced points in their peripheral inter-seating portions as by bolts 20. The joint is preferably sealed by a gasket 21.

Aligned bearings 22 and 22' in the opposed upper and lower wall of the casing 13 pivotally mount the actuating lever 16. The upper bearing 22 is an elongated bearing of generous diameter and is provided in the main body 13a of the casing, while the lower bearing is of reduced diameter and is formed in the removable cover portion 13b.

Each lever 16, for convenience of manufacture and assembly, preferably is made of three separate parts. Each comprises a pivot portion 23 having spaced parts fitting the bearings in the casing and an integral lateral arm 24 extending therefrom intermediately of the bearings and inside the casing. The length of the arm 24 is such as to permit the insertion of the pivot portion 23 from the bottom, when the cover 13b is not in place.

The pivot portion 23 also has an extension beyond the bearing 22 projecting outside the casing 13, and non-rotatably secured to this extension is a second part of the lever, an arm designated generally by 26. This arm has a hub portion 27 splined to the extension of pivot portion 23 and held in place by a lock washer and a nut 28 screwed on the reduced threaded end of the extension. This arm preferably has two parts 26a and 26b extending in different directions from the hub portion 27, the part 26a being adapted to pivotally support, at 29 the associated brake shoe 18 and the part 26b being adapted to be connected to a manually-operated brake actuating mechanism where manual actuation is provided, in addition to the cylinder actuation. Where manual-actuation is not required, the part 26b could be omitted.

A third part of the actuating lever 16 comprises the arm 30 having a hub portion adapted to slidably receive the pivotal portion 23 and having abutting relation with one side of the arm 24 extending therefrom. The arm 30 is securely locked to rotate with the pivot portion 23 by a stud and nut 31, the stud having an enlarged part fitting a corresponding opening in arm 24 and a smaller part screwed into the arm 30. The nut cooperating with the stud is locked as by a lock washer. Arm 30 extends through a widened slot 32 in the wall of cylinder 14 and also through a corresponding slot 33 in the skirt of the associated piston 15, its free end abutting the central portion of the piston for actuation thereby.

To take the radial and thrust loads on the bearings, each bearing is preferably provided with a flanged hardened lining sleeve, the sleeve in bearing 22 being designated 34 and the sleeve in bearing 23 being designated 35. Between the hub of the arm 33 and the flange of the bearing sleeve 34 are provided additional replaceable bearing washers 36 and a similar washer 37 is inserted between the arm 24 and the flange of bearing sleeve 35.

The top cylindrical bearing can be readily sealed against the entrance of dirt or water, by a suitable annular sealing means, as 38 inserted in a groove formed by the annular projection 39 on the casing and spaced from the pivot portion 23. A downwardly facing cup-shaped washer 40 having its peripheral portion overhanging the projection 39 and its central portion clamped between a shoulder on pivot portion 23 and the hub 27 of arm 26, is further protection against entrance of dirt and water.

For convenience of manufacture, the bearing opening in the cover member 13b is drilled through it and is sealed at the outside by a closing plate 41 pressed into an enlarged outer end of the opening against a shoulder formed thereby.

From the foregoing description it will be seen that a very practical structure has been devised in which the parts, when assembled provide a sturdy and efficient construction, and in which the parts are so related as to facilitate their manufacture and assembly, and, when assembled, they provide an adequately sealed casing for housing the greater part of the operating mechanism.

The assembly of the parts may proceed as follows:

The cover 13b being removed, the lever arm 30 is first inserted through the lower opening in the casing and its end passed through the aligned slots 32 and 33 in the cylinder and piston, respectively, until it rests in cooperative relation with the center of the piston. During this operation, the return spring 19 may be held compressed by a suitable tool. When the arm is in place, the spring is allowed to expand into engagement with it, as shown. The bearing washers 36 and the hub of the arm 30 are then located in alignment with the bearing 22 and the pivot portion 23 is passed upwardly through these aligned portions until the arm 24 engages the arm 30. The packing 38, cup 40 and arm 26 may then be successively assembled on the upper end of the pivot portion 23, and the nut and stud 31 tightened to lock the arms 24 and 30 together. Finally, the cover portion 13b is brought in place, with the bearing 23 thereon slipped over the lower reduced ends of the pivot portion 23 and locked in sealed relation with the main body of the casing 13a by the bolts 20 and sealing gasket 21. Similarly, but in reverse order, the disassembly may be effected with equal ease.

While a specific embodiment of the invention has been herein described, it will be understood that the main features thereof may be embodied in other forms which readily fall within the knowledge of those skilled in the art, and in the following claims it is intended to cover such other embodiments.

What is claimed is:

1. In a brake mechanism, a support including a casing comprising two separable parts divided along a generally horizontal plane, one part having a fixed bearing in a wall thereof, the other part carrying an opposed spaced bearing removable with it, and an actuating lever pivoted in said bearings, said lever comprising at least two parts, one part including a pivot portion engaging said spaced bearings and an arm extending therefrom outside the casing, the other part comprising an arm extending into the casing and having a hub portion slidably fitting the pivot portion extending between said bearings and connected to rotate with the pivot portion by a torque arm on the pivot portion secured to said arm having the hub portion.

2. In a brake mechanism, a support for a brake shoe including a casing comprising two separable parts divided along a generally horizontal plane, one part having a fixed bearing in one wall thereof, the other part carrying an opposed spaced bearing removable with said part, an actuating lever pivoted in said bearings, said actuating lever comprising a pivot portion engaging said bearings and having one end thereof projecting beyond the adjacent bearing outside the casing and an arm non-rotatably secured to said pivot portion and extending into the casing for engagement with an actuator therein and an arm disposed outside the casing for engagement with an associated shoe and having a hub portion non-rotatably but removably secured to said projecting portion of the pivot portion.

3. In a brake mechanism, a support including a casing having spaced bearings in two opposed walls thereof, a brake actuating lever mounted in said bearings, said lever comprising three parts, namely, a pivot portion mounted in said bearings and having a laterally extending arm thereon intermediate said bearings, an arm extending on the outside of the casing and non-rotatably secured to said pivot portion, and another arm extending into the casing and sleeved onto the intermediate portion of said pivot portion and secured to the laterally extending arm thereof.

4. In a brake mechanism, a support for a brake shoe including a casing having spaced bearings in two opposed walls thereof, a brake actuating lever mounted in said bearings through a pivot portion thereof, said lever having an arm non-rotatably secured to said pivot portion and extending into the casing for co-action with an actuator therein, and a second arm secured to the pivot portion externally of the casing and having parts extending in different direction from said pivot portion, one part for operative engagement with an associated brake shoe and the other, for engagement with a manually-operated means.

PAUL W. GAENSSLE.